United States Patent Office 3,115,278
Patented Dec. 24, 1963

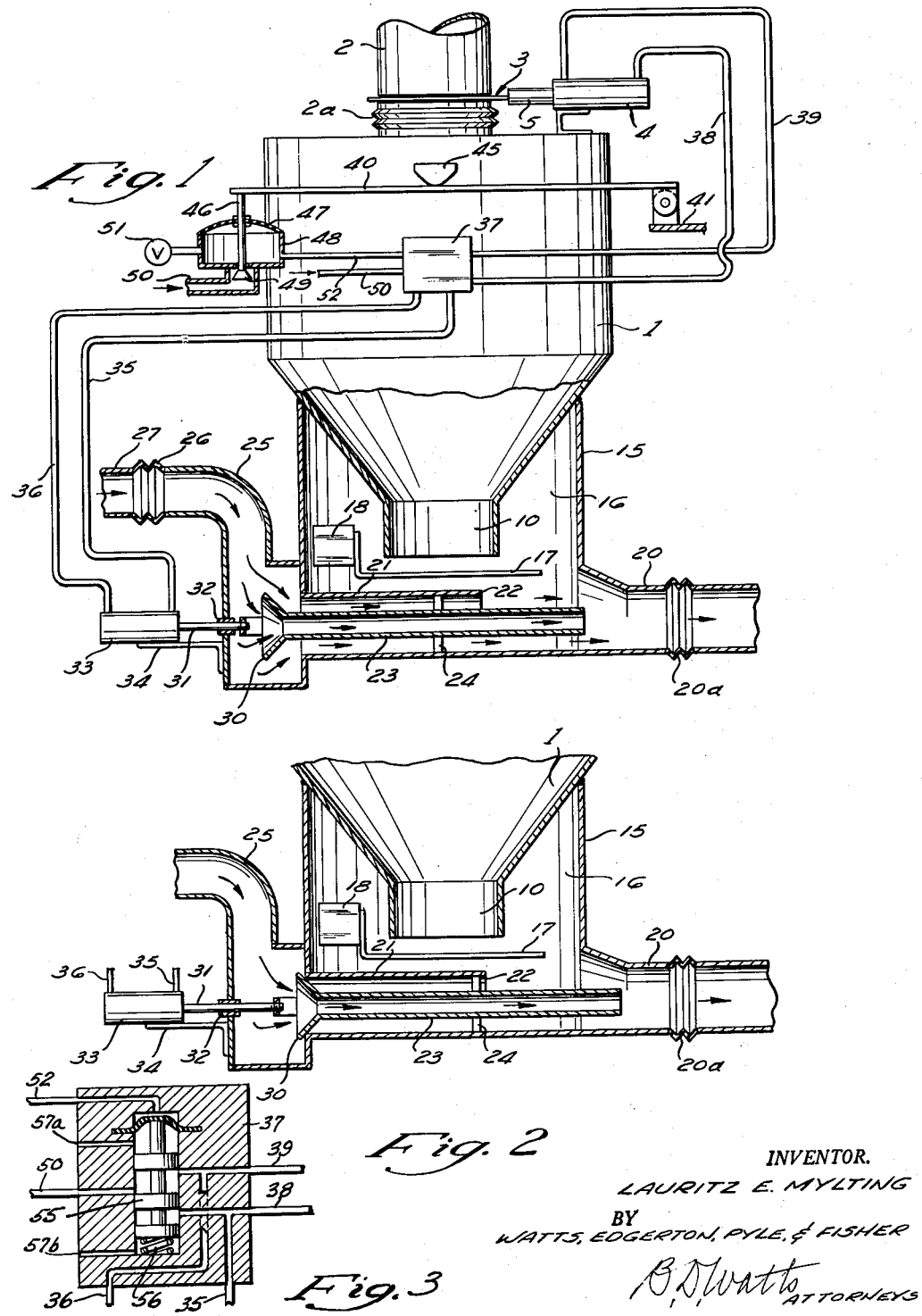

3,115,278
FINE SOLIDS HANDLING DEVICE
Lauritz E. Mylting, Ardmore, Pa., assignor to
A-S-H Industries, Inc.
Filed Jan. 5, 1961, Ser. No. 80,824
6 Claims. (Cl. 222—56)

This invention relates generally to the pneumatic handling of free flowing solids and is more particularly concerned with means for controlling the flow of air and dust in an intermittently feeding, single chamber air lock in a pneumatic materials handling system operating at pressure above atmospheric pressure.

The present invention aims to provide a device which will remove such solids from a hopper by entraining them in an air stream and thereby transporting them to a place of disposal and which will automatically act as an aspirator to exhaust air from the hopper and place it under negative pressure while maintaining uninterrupted flow of air through a housing below the hopper. The creation of the negative pressure would prevent dust from blowing out of the hopper and would cause air to flow into the hopper when the gate at the charging opening in the upper part of the hopper is open and solids are being brought into the hopper. The continuous flow of air through the housing would avoid the use of complicated and unsatisfactory means for stopping the flow of air during the charging of solids into the hopper.

This aim is achieved by means embodying the invention, a preferred form of which is described hereinafter and disclosed in the drawings accompanying and forming a part of this specification in which:

FIGURE 1 is a side view partly in elevation showing the parts of the preferred device in the positions they occupy when solids are being removed from the hopper; and FIGURE 2 is a fragmentary view similar to part of FIGURE 1 but showing the parts in the position they occupy during the time solids are being charged into the hopper; and FIG. 3 is a sectional, diagrammatic view of a four-way valve for controlling the flow of air through the housing of FIGS. 1 and 2.

In the drawings, the hopper 1 may be of any conventional form suitable for receiving finely divided solids. Such solids may be carried in pipe 2 and charged through and into the upper part of hopper 1. A flexible section 2a of pipe connects pipe 2 to hopper 1. A gate, indicated generally at 3, is provided for controlling the flow of solids through pipe 2 and may be actuated to open and closed position by any suitable means, such as cylinder 4, rod 5 and a piston (not shown) disposed within cylinder 4.

In its lower portion hopper 1 is provided with an outlet 10 through which solids may flow from the interior of the hopper. A housing 15 is attached to the hopper 1 and defines a chamber 16 below and surrounding outlet 10 and into which solids may be discharged through outlet 10.

Means is provided for feeding solids through outlet 10 in the chamber 16. While any conventional means may be employed for this purpose, vibrating means is illustrated in FIGURES 1 and 2 and comprises a substantially horizontal plate 17 disposed beneath the lower end of outlet 10 and a vibrator 18 which supports and reciprocates the plate 17 rapidly with resultant flow of solids off the edges thereof and into the space in chamber 16 below the plate. It will be understood that the plate 17 is large enough to extend beyond the angle of repose of the free flowing solids in outlet 10 and that, accordingly, the solids will not flow off plate 17 when it is at rest but that they will flow off that plate when the plate is reciprocating.

Means is provided in the lower part of housing 15 for entraining the solids in the lower part of chamber 16 in an air stream and transporting them to a place of disposal. The means illustrated for this purpose includes a conduit 20 which opens out of housing 15 near and below the free end of plate 17, a casing 21 which extends inwardly from the housing opposite conduit 20 and is open at each end with the inner end 22 being disposed beneath plate 17, and a tube 23 disposed within casing 21 and being long enough to extend from the outer end of casing 21 to a point within conduit 20. A spider 24, engaging the inner surface of the bottom wall of housing 15 and the inner surface of casing 21, receives and supports the tube 23 for sliding endwise movement. The outer end of tube 23 is bell-shaped as indicated at 30 and this portion of the tube serves to close the passage between casing 21 and tube 23 when the latter is in its innermost position as is shown in FIGURE 2. A pipe 25 is connected to housing 15 adjacent to outer ends of casing 21 and tube 23 and serves to conduct air under pressure through the casing and tube. The conduit 20 is connected to a fixed tube by a flexible tubular sleeve 20a.

Pipe 27 to which pipe 25 is connected by flexible connection 26 is provided with a shut off valve (not shown) to control the flow of air through pipe 25.

Means is provided for automatically controlling the discharge of solids into and out of hopper 1. This means includes valve means for automatically actuating gate 3 and tube 23 and position-sensing means for controlling that actuating means.

The means for actuating tube 23 includes a rod 31 which is connected to end 30 of tube 23, has a sliding fit in bearing 32 in pipe 25 and is connected to a piston (not shown) disposed within the cylinder 33 which is supported on a bracket 34 attached to the pipe 25. The ends of cylinder 33 are connected by flexible tubing 35 and 36 to a four-way valve 37. The means for actuating gate 3 comprises flexible tubing 38 and 39 connected to opposite ends of cylinder 4 and to four-way valve 37.

The position-sensing means which controls the operation of the pistons in cylinders 4 and 33 includes a frame which surrounds hopper 1, one side bar of which is shown at 40, and a pressure vessel 48. At one end the frame is pivotally supported by fixed means 41. Diametrically opposite lugs 45 attached to hopper 1 rest on the bars 41 of the supporting frame so that the weight of the hopper, housing 15 and pipe 25 as well as the contents of the hopper are supported by that frame. At its end remote from support 41, the frame carries a depending rod 46 which is connected to, and passes through, the diaphragm portion 47 of the pressure vessel 48 and which carries at its lower end a valve 49 which serves to control the flow of air under pressure through tube 50 and into vessel 48. A bleed valve 51 serves to permit air under predetermined pressure to escape from vessel 48. The interior of the vessel 48 is connected by tubing 52 to four-way valve 37.

The four-way valve (FIG. 3) is of a conventional spring-loaded type, that is, a movable element or valve 55 in the valve housing 37 is moved by air pressure line 52 to connect tube 50, leading from a source of air under pressure (not shown), with tubing 35 and 38 when there are solids in hopper 1 to be removed, and is moved by spring 56, when the air pressure falls below a predetermined minimum, to connect tube 50 with tubing 39 and 36 when solids are to be charged into hopper 1. Air trapped in the valve housing 37 at the ends of the valve 55 may escape through passages 57a and 57b.

When the air pressure in chamber 48 is above that predetermined minimum value and vibrator 18 is actuated, solids will be discharged from hopper 1 and will be transported into and through conduit 20 by air flowing through pipe 25, casing 21 and tube 23. The pressure in chamber 48 is high enough to initiate and maintain flow of air through casing 21 and tube 23 so long as there are solids in hopper 1. When the hopper is emptied the spring in valve 37 takes charge with resultant closing of the passage through casing 21 and opening of gate 3. Since air will continue to flow through pipe 25 and tube 23, such air flow will exert an aspirating action in the hopper and housing. Hence, solids flowing into hopper 1 will be prevented from seeking outlets to the exterior of the hopper. Thus, the charging of the hopper will be clean and free from escaping dust.

Preferably, vibrator 18 is connected to a limit switch on gate 3 and is energized when the gate is fully closed but is deenergized when the gate is in any other position. This insures against back flow of fine solids around the gate and into the surrounding atmosphere.

It will be understood that the device disclosed by this application prevents solids from escaping into the atmosphere while being transferred into the hopper and that they are rapidly transported from the interior of the hopper to a place of disposal. It will also be understood that the disclosed device is substantially automatic in shifting from the solids handling action to the aspirating action and from the aspirating action to the dust handling action.

It will also be understood that the present invention may be embodied in apparatus which is quite inexpensive to manufacture and which is simple and automatic in operation.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention set forth in what is claimed.

What is claimed is:

1. A device for handling fine solids which comprises a hopper having an inlet in its upper portion and an outlet in its lower portion, a gate to open and close said inlet, a housing attached to the hopper and defining a chamber into which said outlet opens, means in the chamber below said outlet for feeding solids through said outlet and into said chamber, a conduit leading out of the chamber below said feeding means, and means to control the charging of solids into the hopper and their removal therefrom, said means including position-sensing means responsive to the weight of solids in the hopper, and a four-way valve controlled by said position-sensing means and adapted to control the movement of said gate and the removal of solids from the housing.

2. A device for handling fine solids which comprises a hopper having an inlet in its upper portion and an outlet in its lower portion, a gate to close said outlet, fluid pressure means to move said gate to open and closed position, a housing attached to the hopper and defining a chamber into which said outlet opens, means in the chamber below said outlet for feeding solids through said outlet and into the chamber, means energized by the closing of the gate for activating said feeding means, and means for transporting solids out of the chamber including a conduit leading out of the chamber below said feeding means, an open-ended movable tube to discharge air under pressure continuously into said chamber below said feeding means, a casing closable by said movable tube and adapted when open to discharge air under pressure into said chamber, fluid pressure means to move said tube to open and close said casing, a four-way valve to control the flow of fluid under pressure to said gate moving means and to said tube moving means, and position-sensitive means actuated by limited vertical movement of said hopper for actuating said four-way valve.

3. A device for handling fine solids which comprises:
(a) a hopper having an outlet in the lower portion,
(b) a housing attached to the hopper and defining a chamber into which said outlet opens,
(c) a solids feeder in the chamber below said outlet and having a free end,
(d) a conduit leading out of said chamber and having an inlet end near and below the free end of said feeder,
(e) and means for selectively removing solids from said chamber and for reducing the air pressure in said hopper when solids are to be charged thereinto,
(f) said removing means including means to discharge an air stream of a constant rate of flow and at a given velocity into said chamber beneath said feeder in solids transporting relation from the chamber through said conduit, and said pressure reducing means including means to discharge an air stream at said constant rate of flow but at increased velocity into said chamber near the inlet of said conduit,
(g) means including a four-way valve for selecting the desired air stream for the intended purpose and
(h) means controlled by the presence or absence of solids in the hopper for actuating said valve.

4. A device for handling fine solids which comprises:
(a) a hopper having an outlet in the lower portion,
(b) a housing attached to the hopper and defining a chamber into which said outlet opens,
(c) a solids feeder in the chamber below said outlet and having a free end,
(d) a conduit leading out of said chamber and having an inlet end near and below the free end of said feeder,
(e) and means for selectively removing solids from said chamber and for reducing the air pressure in said hopper when solids are to be charged thereinto,
(f) said removing means including means to discharge an air stream of a constant rate of flow and at a given velocity into said chamber beneath said feeder in solids transporting relation from the chamber through said conduit, and said pressure reducing means including means to discharge an air stream at said constant rate of flow but at increased velocity into said chamber near the inlet of said conduit, and means including a four-way valve for selecting the desired air stream for the intended purpose.

5. A device for handling fine solids which comprises:
(a) a hopper having an outlet in the lower portion,
(b) a housing attached to the hopper and defining a chamber into which said outlet opens,
(c) a solids feeder in the chamber below said outlet and having a free end,
(d) a conduit leading out of said chamber and having an inlet end near and below the free end of said feeder,
(e) and means for selectively removing solids from said chamber and for reducing the air pressure in said hopper when solids are to be charged thereinto,
(f) said removing means including means to discharge an air stream of a constant rate of flow and at a given velocity into said chamber beneath said feeder in solids transporting relation from the chamber through said conduit, and said pressure reducing means including means to discharge an air stream at said constant rate of flow but at increased velocity into said chamber near the inlet of said conduit.

6. A device for handling fine solids which comprises:
(a) a hopper having an outlet in the lower portion,
(b) a housing attached to the hopper and defining a chamber into which said outlet opens, (c) a solids feeder in the chamber below said outlet and having a free end,
(d) a conduit leading out of said chamber and having an inlet end near and below the free end of said feeder,
(e) means for selectively removing solids from said chamber including a fixed conduit having an open end below and near the free end of the feeder, and means to discharge an air stream of a constant rate of flow and at a given velocity through said fixed conduit,
(f) and means for reducing the air pressure in said hopper when solids are to be charged thereinto including a movable tube to close said fixed tube and having an open end beyond the free end of said feeder,
(g) a valve for controlling the flow of fluid under pressure through said fixed conduit and said tube, and
(h) means actuated by limited vertical movement of the hopper for actuating said valve.

References Cited in the file of this patent
UNITED STATES PATENTS

| | | |
|---|---|---|
| 2,065,079 | Lauterbur | Dec. 22, 1936 |
| 2,359,029 | Goldberg | Sept. 26, 1944 |
| 2,381,505 | Lindholm | Aug. 7, 1945 |
| 2,779,510 | Wilson et al. | Jan. 29, 1957 |
| 2,916,441 | Kruse | Dec. 8, 1959 |